Patented Aug. 11, 19                                    2,292,903

UNITED STATES PATENT OFFICE 2,292,903

CHROMITE REFRACTORY

Gilbert E. Seil, Cynwyd, Pa., assignor to E. J. Lavino and Company, Philadelphia, Pa., a corporation of Delaware No Drawing. Application September 9, 1937, Serial No. 163,031

6 Claims. (Cl. 106—59)

This invention relates to chromite refractories and more particularly to corrected chromite refractories of improved chemical and physical characteristics.

In my United States Patents No. 2,028,017, No. 2,028,018, No. 2,037,600 and No. 2,060,697, I have described the disadvantages of crude chrome ore when used for the manufacture of refractory materials. I have shown in Patent No. 2,028,017 how the ore is physically corrected by heat treatment below the fusion point of the ore but above the critical temperature at which recrystallization of the chromite and redistribution of the gangue minerals take place. I have also described in this patent refractory bodies of superior characteristics made with such physically corrected ore. In my Patents No. 2,028,018, No. 2,037,600 and No. 2,060,697 I have described a physically and chemically corrected chromite refractory material made by heat treatment of the chrome ore, in admixture with finely divided magnesium oxide producing compounds, above the critical temperature at which recrystallization of the chromite, redistribution of the gangue minerals, and the formation of forsterite from the magnesium compounds and the magnesium silicate of the ore take place without decomposition of the chromite or fusion of the mass. In these last three patents I have also described refractory bodies, having greatly increased hot strength and other novel and superior characteristics, composed substantially of chromite surrounded and bonded by films of forsterite.

Further research on the elimination of the disadvantages inherent in refractory materials composed of crude chrome ore resulted in my United States Patent No. 2,066,543. In this patent I describe a chromite refractory in which the low melting point magnesium silicate minerals are corrected by conversion to high melting point spinel and mullite. The correction is accomplished by heat treatment of the ore in intimate admixture with calculated amounts of aluminum oxide ($Al_2O_3$), or materials yielding $Al_2O_3$ for the necessary reactions, at a temperature above the critical point at which recrystallization of the chromite, redistribution of the gangue and formation of the magnesia-alumina spinel $$(MgO.Al_2O_3)$$

and mullite ($3Al_2O_3.2SiO_2$) take place, but below the fusion point of the mass.

I have discovered a new method for correcting the secondary component in chrome ore, increasing the melting point of this component, and producing a chromite refractory material of improved chemical and physical characteristics.

The above discovery is the basis of this invention, which has for its major objects (1) the ultimate production of a refractory body or brick having novel as well as superior characteristics, and (2) the production from chrome ore of an improved substance for use as a starting material for making such a refractory body.

These objects are accomplished by providing sufficient lime to convert the silica in the chrome ore to calcium orthosilicate, or to monticellite and calcium orthosilicate, or to monticellite, the calculated addition taking into consideration the percentages of lime and silica in the starting materials, and under proper and controlled heat conditions, recrystallizing the chromite of the ore and converting the lime and silica to calcium orthosilicate, or to calcium orthosilicate and monticellite, or to monticellite, a portion or all of the magnesium originally combined with silica being converted to periclase.

Calcium orthosilicate ($2CaO.SiO_2$) has a melting point of 3866° F., is a neutral material and does not react readily with either acids or bases. Monticellite, on the other hand, is the ortho silicate of lime and magnesia ($CaO.MgO.SiO_2$) and melts or decomposes at 2728° F.

If the lime-silica ratio in the mix is such that the molecular percentage of silica exactly equals the molecular percentage of lime, then these two will unite with an equal molecular percentage of magnesia to form monticellite. If, on the other hand, the molecular percentage of lime is twice the molecular percentage of silica, then only calcium orthosilicate is formed. Percentages between these two figures yield both calcium orthosilicate and monticellite. In other words, the ratio of lime to silica determines definitely whether the mixture is to contain calcium orthosilicate or monticellite, or a mixture of these two compounds.

It is a further object of this invention to predetermine the amounts of calcium orthosilicate and monticellite which will be formed in the refractory body. Since there is a difference of over 1000° F. between the melting points of these two compounds, the calcium orthosilicate is considered a refractory component of the body, whereas the monticellite, because of its lower melting point, becomes a secondary component. The amount of monticellite affects the heat bonding temperature of the mass and the firing temperature of the shaped product.

Control of the amounts of calcium orthosilicate and monticellite which will be formed in the refractory body is accomplished by control of the lime addition to the mixture from which the refractory body is made. The amount of monticellite formed in a given weight of the finished product may be calculated from the formula:

Number of pounds of monticellite = 5.2096 (number of pounds of $SiO_2$) − 2.790 (number of pounds of CaO)

This formula is derived as follows:

Let
X = number of pounds of $(CaO)_2.SiO_2$
    which will be formed
and
Y = number of pounds of $CaO.MgO.SiO_2$
    which will be formed Since $(CaO)_2.SiO_2$ contains 65.12% CaO and 34.88% $SiO_2$, and
Since $CaO.MgO.SiO_2$ contains 35.84% CaO and 38.39% $SiO_2$
Then
$$.6512X + .3584Y = \#CaO$$
and
$$.3488X + .3839Y = \#SiO_2$$

$(.6512)(.3488)X + (.3584)(.3488)Y = .3488(\#CaO)$
$(.6512)(.3488)X + (.6512)(.3839)Y = .6512(\#SiO_2)$ $.125Y − .250Y = .3488(\#CaO) − .6512(\#SiO_2)$
$.125Y = .6512(\#SiO_2) − .3488(\#CaO)$
$Y = 5.2096(\#SiO_2) − 2.790(\#CaO)$

Whenever free lime (CaO) is present in a refractory body, there is a definite tendency toward hydration and disintegration in the presence of any moisture. In addition, free lime causes the body to be exceedingly basic. Free lime is a very reactive material and is used extensively in the refining of steel. It reacts with nearly every slag used in metallurgical practice.

Because of its tendency toward hydration, its great chemical reactivity and its extreme basicity, free and uncombined lime, that is calcium oxide, is a very undesirable constituent of refractory bodies, despite its high melting point.

The invention may be practiced in several ways:

(1) The crude chrome ore, ground to a suitable mesh ratio for the manufacture of refractory shapes may be mixed with the desired amount of calcium oxide yielding material and the stabilizer in a wet pan (preferably after premixing in a dry mixer), tempered, pressed into brick and then dried and burned at a temperature of the order of 3000° F. in the manner usually practiced in the art.

(2) The crude chrome ore may be exposed to a heat treatment (as described in my Letters Patent 2,028,017) preferably in a rotary kiln and at a temperature above 3100° F. After cooling, the ore is ground to a suitable mesh ratio for the manufacture of refractory shapes, and the invention is thereafter followed as in Method 1.

(3) The desired proportions of chrome ore, lime and stabilizer, in intimate admixture and preferably fine ground (to pass a number 20 Bureau of Standards screen) are heated to stabilization at a temperature in excess of 3,000° F. above the critical point at which takes place recrystallization of the chromite, redistribution of the gangue minerals of the ore, and the conversion of the lime and silica to calcium orthosilicate, with or without monticellite, but without fusion of the mass. Upon cooling, the resulting product is ground to a suitable mesh ratio for the manufacture of refractory shapes, and made into a finished refractory body in accordance with the usual procedure. Or the resulting product may be sold, either as produced or ground, as a refractory material to be used in the manufacture of refractory shapes, plastics, etc.

(4) The chrome ore to which a portion of the lime forming material and the amount of stabilizer necessary for this addition, in intimate admixture and preferably fine ground, may be heated to stabilization as described in Method 3. The resulting product, after cooling, is ground to a suitable mesh ratio for brick manufacture, and made into refractory shapes in the usually practiced manner, but adding the remainder of the lime and stabilizer to the material while it is being tempered in the wet pan or other mixer.

As examples of the method in which the calculations are made, and by which the invention is practiced, consider a chrome ore of the following typical analysis:

| | Per cent |
|---|---|
| $Cr_2O_3$ | 45.74 |
| $SiO_2$ | 9.17 |
| FeO | 15.42 |
| $Al_2O_3$ | 12.03 |
| CaO | 0.95 |
| MgO | 13.77 |

For the correction of this chrome ore, it is desired to use a chemical lime of the following composition:

| | Per cent |
|---|---|
| CaO | 71.00 |
| MgO | 1.00 |
| $Fe_2O_3$ | 0.30 |
| $SiO_2$ | 0.05 |
| $Al_2O_3$ | 0.25 |
| Ignition loss | 27.40 |

In the first example consider that it is desired to convert all the silica to calcium orthosilicate. In 100 pounds of the chrome ore there are 9.17 pounds of $SiO_2$ and 0.95 pounds of CaO. In calcium orthosilicate ($2CaO.SiO_2$), 60 parts by weight of $SiO_2$ are combined with 112 parts by weight of CaO, that is, each pound of $SiO_2$ requires 1.86+ pounds of CaO for conversion to $2CaO.SiO_2$, and 9.17 pounds of $SiO_2$ will require 17.056 pounds of CaO. However, 100 pounds of the chrome ore contains 0.95 pound of CaO, so that the amount of CaO to be obtained from the corrective material is the difference between 17.056 pounds and 0.95 pound, or 16.106 pounds.

Since the corrective material contains 71.00% CaO on the as received basis, the amount of chemical lime needed to correct 100 pounds of the chrome ore in this case is 16.106/0.71 or 22.68 pounds.

The mixture in this example would therefore consist of 100 pounds of chrome ore, 22.68 pounds of chemical lime, and with this mixture I prefer to use 1.22 pounds of commercial 75% phosphoric acid, yielding about 0.5% $P_2O_5$ in the finished product. The $P_2O_5$ acts as a stabilizer for the calcium orthosilicate formed.

As a second example, consider that it is desired to convert all the silica to monticellite. In 100 pounds of chrome ore there are 9.17 pounds of $SiO_2$ and 0.95 pound of CaO. In monticellite ($CaO.MgO.SiO_2$) 60 parts by weight of $SiO_2$ are combined with 40 parts by weight of MgO and 56 parts by weight of CaO, that is each pound of $SiO_2$ requires 0.933 pound of CaO and 0.667 pound of MgO for conversion to monticellite, and 9.17 pounds of $SiO_2$ will require 8.556 pounds of CaO and 6.116 pounds of MgO. However, 100 pounds of the chrome ore contains 0.95 pound of CaO, so that the amount of CaO to be obtained from the corrective material is the difference between 8.556 pounds and 0.95 pound, or 7.606 pounds.

Since the corrective material contains 71.00% of CaO on the as received basis, the amount of chemical lime needed to correct 100 pounds of the chrome ore in this case is 7.606/0.71 or 10.713 pounds.

Although the chrome ore shows 13.77% MgO on chemical analysis, not all this magnesia is available for reaction with $SiO_2$ and CaO. Chrome ore consists of two components. The primary component is the mineral chromite, which has the composition $$(FeO.MgO)(Cr_2O_3.Al_2O_3)$$

that is, the molecular sum of the bases (FeO+MgO) is always equal to the molecular sum of the acids ($Cr_2O_3+Al_2O_3$). The chromite may be recrystallized, but never decomposed, by my process, and therefore the magnesium combined in the chromite is not available for reaction with silica and lime. The secondary component consists of magnesium silicate minerals, and it is composed of the silica of the ore and the magnesium not tied up in the chromite. In some cases there is sufficient available magnesia to completely convert the silica and lime to monticellite, but since I prefer excess periclase in the finished product, I should in this case, add the amount of MgO calculated for the monticellite, namely 6.116 pounds per 100 pounds of chrome ore.

The mixture in the second example would therefore consist of 100 pounds of chrome ore, 10.325 pounds of chemical lime, sufficient periclase or other MgO yielding material to supply 6.116 pounds of MgO, and sufficient phosphoric acid to supply 0.5% $P_2O_5$ to the finished product.

As a third example, consider the following mixture, which will yield a product containing both calcium orthosilicate and monticellite.

|  | Quantity used | Ignited weight | CaO contained | $SiO_2$ contained |
|---|---|---|---|---|
|  | Pounds | Pounds | Pounds | Pounds |
| Chrome ore | 100 | 100 | 0.95 | 9.17 |
| Chemical lime | 17 | 14 | 12.07 |  |
| Totals | 117 | 114 | 13.02 | 9.17 |

The silica contained in 17# of the chemical lime is only .0085#, and it is disregarded for these calculations.

According to the formula previously explained, the number of pounds of monticellite formed in the above mixture will be 5.2096(9.17) − 2.790(13.93) or 8.91.

The number of pounds of silica combined in the monticellite will be 0.3839(8.91) or 3.42.

The number of pounds of silica combined in the calcium orthosilicate will be the difference between the total silica and the silica in the monticellite, or 9.17−3.42=5.75 pounds.

The number of pounds of calcium orthosilicate formed is therefore 5.75/.3488 or 16.485.

The percentages of monticellite and calcium orthosilicate in the finished product are obtained by dividing the weights by the weight of the product and multiplying by 100, thus Per cent monticellite=8.91/114×100=7.82
Per cent calcium orthosilicate=
16.485/114×100=14.46

Since the ratio of MgO to $SiO_2$ in the secondary component of chrome ore varies from $2MgO.3SiO_2$ to $3MgO.2SiO_2$, there is an excess of MgO available for the reaction, and the excess above that required for the monticellite will be converted to periclase. In this mixture I also prefer to use 1 pound of commercial 75% phosphoric acid per 100 pounds of mixture as a stabilizer for the calcium orthosilicate.

In the examples cited I have used phosphoric acid as a source of $P_2O_5$ for stabilizing the calcium orthosilicate formed in the finished products. Calcium orthosilicate exists in two forms, with a great difference in specific gravity and in specific volume between the two forms. By the addition of a small percentage of phosphate to the mixture the crystalline form which is stable at high temperatures without the presence of phosphate becomes stable at low temperatures. Borates and compounds containing boric acid may also be used for this stabilization, but phosphates are cheaper and more effective. It is preferable to use dilute phosphoric acid for tempering the mass prior to burning in order to obtain maximum distribution of the stabilizing agent. Other sources of $P_2O_5$, such as phosphate rock (calcium phosphate) may also be used, but in this case the amount of CaO introduced into the mixture must be considered in calculating the lime-silica ratio.

The invention is, of course, applicable to chrome ores other than the one used in the examples. In addition to the so called "chemical lime," such material as limestone, chalk or whiting, calcite, arogonite, and dolomite, either in the crude state or after burning to remove the volatile matter, may be used as sources of CaO.

Having thus described and exemplified my invention, to which examples the scope of the invention is by no means limited, I claim:

1. A refractory material comprising chromite, stabilized calcium orthosilicate in physical and chemical equilibrium and periclase having substantially no residual free lime, substantially no free silica and substantially no chromate.

2. A shaped refractory body comprising chromite, stabilized calcium orthosilicate in physical and chemical equilibrium and periclase having no substantially no residual free lime, substantially no free silica and substantially no chromate.

3. The process of making refractory material which includes the steps of heat-treating chrome ore at a temperature in excess of 3000° F. whereby the chromite of the ore is recrystallized and the crystals thereof are surrounded by secondary component material in thin films, and subjecting the secondary component material to a reaction inducing heat treatment at a temperature in excess of 3000° F. in the presence of an amount of lime bearing material lying within a range of lime to silica ratios on a molecular basis between unreached limits of from 1:1 to 2:1 so calculated that the secondary component is converted into periclase and monticellite with substantially no residual free lime and substantially no chromate.

4. The process of making refractory material which includes the steps of heat-treating chrome ore at a temperature in excess of 3000° F. whereby the chromite of the ore is recrystallized and the crystals thereof are surrounded by secondary component material in thin films, and subjecting the secondary component material to a reaction inducing heat treatment at a temperature in excess of 3000° F. in the presence of an amount of lime bearing material lying within a range of lime to silica ratios on a molecular basis between unreached limits of from 1:1 to 2:1 so calculated that the secondary component is converted into periclase, monticellite and calcium orthosilicate with substantially no residual free lime and substantially no chromate.

5. The process of making a high temperature refractory brick from chrome ore which includes the steps of heat treating the chrome ore at a temperature in excess of 3000° F. until the chromite of the ore is recrystallized and the crystals thereof are surrounded by secondary component material in thin films, grinding the chrome ore thus treated, adding thereto an amount of lime-bearing material so calculated that all of the lime present will combine with the silica of the ore to yield calcium orthosilicate, tempering and shaping the mixture of treated chrome ore and lime and thereafter drying and firing the shapes to a temperature in excess of 3000° F. until the secondary component material of the ore has been converted into periclase and stabilized calcium orthosilicate that is in chemical and physical equilibrium.

6. The process of making a high temperature refractory brick from chrome ore which includes the steps of heat treating the chrome ore at a temperature in excess of 3000° F. until the chromite of the ore is recrystallized and the crystals thereof are surrounded by secondary component material in thin films, grinding the chrome ore thus treated, adding thereto an amount of lime-bearing material so calculated that all of the lime present will combine with the silica of the ore to yield calcium orthosilicate and monticellite, tempering and shaping the mixture of treated chrome ore and lime and thereafter drying and firing the shapes to a temperature in excess of 3000° F. until the secondary component material of the ore has been converted into periclase, stabilized calcium orthosilicate and monticellite.

GILBERT E. SEIL.